United States Patent
Maher et al.

(10) Patent No.: US 6,549,138 B2
(45) Date of Patent: Apr. 15, 2003

(54) METHOD AND APPARATUS FOR PROVIDING DETECTION OF EXCESSIVE NEGATIVE OFFSET OF A SENSOR

(75) Inventors: Thomas R. Maher, Rehoboth, MA (US); David L. Corkum, Attleboro, MA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/947,822

(22) Filed: Sep. 6, 2001

(65) Prior Publication Data

US 2002/0047716 A1 Apr. 25, 2002

Related U.S. Application Data

(60) Provisional application No. 60/234,092, filed on Sep. 20, 2000.

(51) Int. Cl.⁷ .............................................. G08B 21/00
(52) U.S. Cl. ......................................... 340/661; 340/660
(58) Field of Search ................................. 340/657, 660, 340/661, 662, 663, 635; 137/82, 487.5

(56) References Cited

U.S. PATENT DOCUMENTS

| | | | | |
|---|---|---|---|---|
| 4,203,324 A | * | 5/1980 | Baumoel | 73/290 V |
| 4,527,583 A | * | 7/1985 | Simpson | 137/82 |
| 4,581,726 A | * | 4/1986 | Makino et al. | 367/99 |
| RE33,028 E | * | 8/1989 | Simpson | 137/82 |
| 6,353,324 B1 | * | 3/2002 | Uber, III et al. | 324/457 |

* cited by examiner

Primary Examiner—Van Trieu
(74) Attorney, Agent, or Firm—Russell E. Baumann; Frederick J. Telecky, Jr.

(57) ABSTRACT

Detection of excessive negative offset of a condition responsive sensor such as a pressure responsive full Wheatstone bridge element (10) and circuitry associated therewith is obtained by taking the sensor's output signal, preferably after the signal has been compensated for both gain and offset and comparing (Q1) the signal ($V_x$) with a reference voltage ($V_{REF1}$) selected to reflect an unobtainable stimulus input condition and driving the compensated signal to a fault level when the compensated signal exceeds the reference voltage.

7 Claims, 2 Drawing Sheets

METHOD AND APPARATUS FOR PROVIDING DETECTION OF EXCESSIVE NEGATIVE OFFSET OF A SENSOR

This application claims priority under 35 USC Section 119 (e) (1) of provisional application No. 60/234,092 filed Sep. 20, 2000.

FIELD OF THE INVENTION

This invention relates generally to the detection of excessive negative offset shift of a sensor signal, particularly, a signal conditioned sensor signal.

BACKGROUND OF THE INVENTION

Systems interpreting sensor outputs, herein simply called System, often can not detect if a sensor's output offset (i.e., sensor output at minimum stimulus input) has shifted negatively more than an acceptable amount due to one or both of the following:

1. The shifted sensor's output may be outside the System's input range, or
2. The sensor may clamp outputs below a certain level thereby masking the actual negative offset shift.

SUMMARY OF THE INVENTION

An object of the invention is the provision of a sensor which overcomes the above noted prior art limitations. Another object is the provision of a method and apparatus for sensitively detecting negative offset shifts and providing a sensor output by the System indicative of a sensor fault. Yet another object is the provision of such a method and apparatus which provide detection of offset shifts due either to drift in the sensor per se or in the compensation of associated circuitry. Another object is the provision of a method and apparatus for sensitively detecting a negative offset shift of a piezoresistive Wheatstone sensor output and providing a sensor output by the System indicative of a fault.

Briefly in accordance with the invention, the offset compensated signal within a signal conditioning circuit is compared to a reference voltage based on an unobtainable stimulus input condition to determine a fault status. In the event that the fault status is set, the output is driven to an output level interpreted by the System as a fault. The sensor electronic elements include a sense element coupled to an ASIC (application specific integrated circuit) having signal conditioning circuitry including offset and gain compensation.

Although it is not necessary to compensate gain prior to the fault status comparison, superior negative offset drift detection sensitivity can be achieved by basing the comparison on a both offset and gain compensated signal due to ASIC tolerances (i.e., changes in ASIC gain may influence offset).

BRIEF DESCRIPTION OF THE DRAWINGS

Other objects, advantages and details of the novel and improved apparatus and method of the invention appear in the following description of the preferred embodiment of the invention, the detailed description referring to the drawings in which.

DETAILED DESCRIPTION OF THE PREFERRED EMBODIMENT

Figure 1:
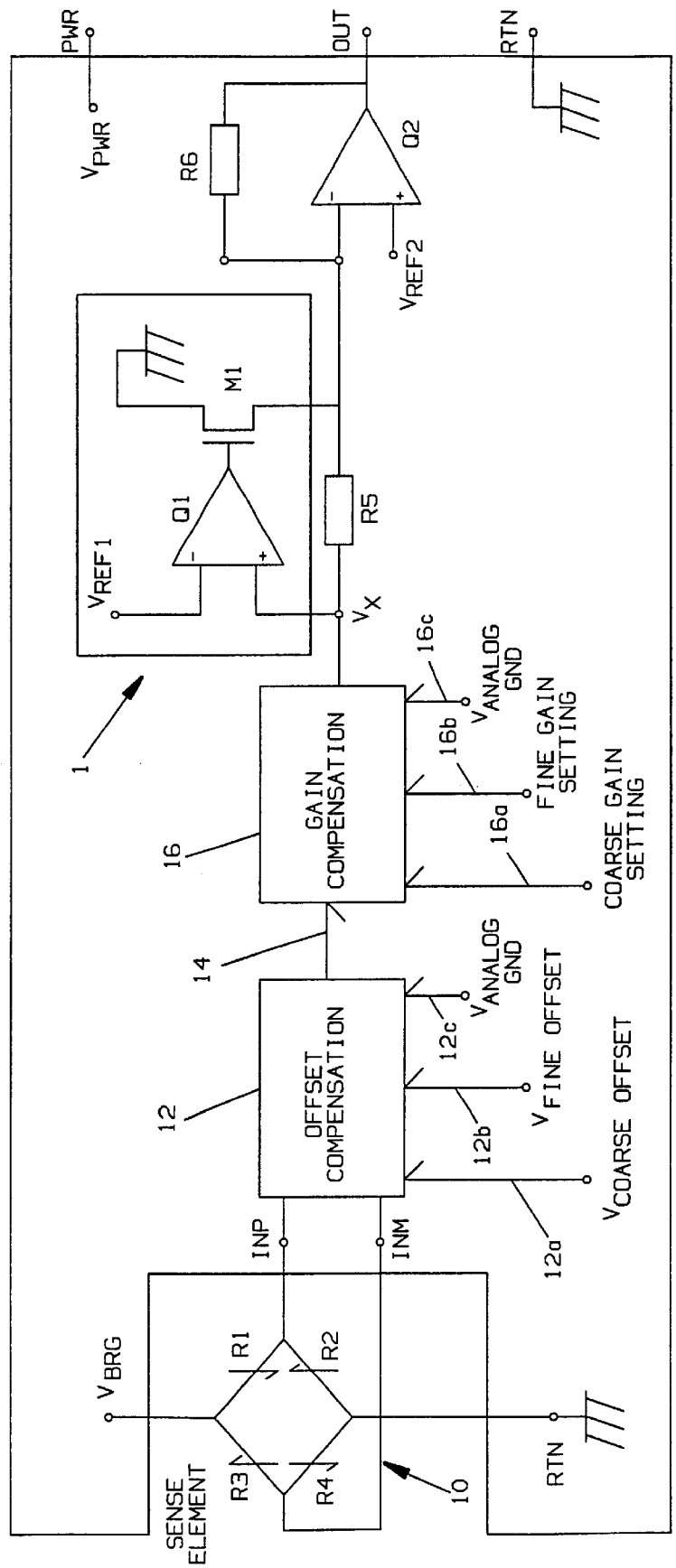
FIG. 1 is a schematic diagram of a Wheatstone bridge sense element coupled to an ASIC in which is shown certain signal conditioning electronics, and an excessive negative offset shift detection circuit. The full Wheatstone bridge sense element outputs are inputs to the ASIC which provides offset compensation and gain compensation to yield an output with a specific output relation versus input stimulus.

A simplified circuit diagram showing one embodiment is shown in FIG. 1. A full Wheatstone bridge 10 is shown as one form of a sensor element used for sensing a pressure stimulus to which the invention applies comprising piezoresistive resistors R1, R2 in one half bridge and R3, R4 in the other half bridge. The full Wheatstone bridge is the parallel connection of the two half bridges and the bridge is connected between a voltage supply $V_{BRG}$ and ground RTN and has first and second outputs INP, INM. Outputs INP, INM serve as inputs to an ASIC having signal conditioning circuitry including offset and gain compensation. As shown in FIG. 1, ASIC inputs INP, INM are connected to a conventional offset compensation section 12 having a coarse adjustment 12a, a fine offset adjustment section 12b, and an analog ground 12c. The output 14 of section 12 is connected to a conventional gain compensation section 16 having a coarse gain setting 16a, a fine gain setting 16b and analog ground 16c.

The output $V_x$ of section 16 is connected to a selected voltage reference $V_{REF1}$. The output of comparator Q1 is connected to a controllable switch such as FET M1. The compensated signal $V_x$ is also connected to resistor R5 which in turn is serially connected to the negative input to amplifier Q2. The positive input to amplifier Q2 is connected to a selected reference voltage $V_{REF2}$ and the output of the amplifier is fed back to the negative input thereof through feedback resistor R6. The output of switch M1 is connected to the negative input of amplifier Q2.

In the circuit shown, compensation causes signal $V_x$ to equal an analog ground voltage at minimum input stimulus. A comparison between the voltage at $V_x$ and $V_{REF1}$ determines the fault status. The reference voltage, VREF1 is equal to an analog voltage plus (for the circuit shown) a tolerance term delta, $\Delta$. For the circuit shown, if the voltage $V_x$ exceeds a threshold value, $V_{REF1}$, the output of Q1 will be a logic "1" which turns on controllable switch FET M1, which in turn pulls down the negative input to amplifier Q2 causing Q2 to drive the sensor output to the high supply rail, $V_{PWR}$. The tolerance term delta, $\Delta$, should be made as small as possible to maximize detection sensitivity without causing nuisance fault reporting. Although one specific embodiment has been shown, the invention relates to any sensor conditioning circuit that provides access to a voltage following offset trimming which is sufficiently within the supply rails to permit voltage comparisons between the offset corrected signal and a reference voltage between the initial offset corrected signal and supply rail.

Figure 2:
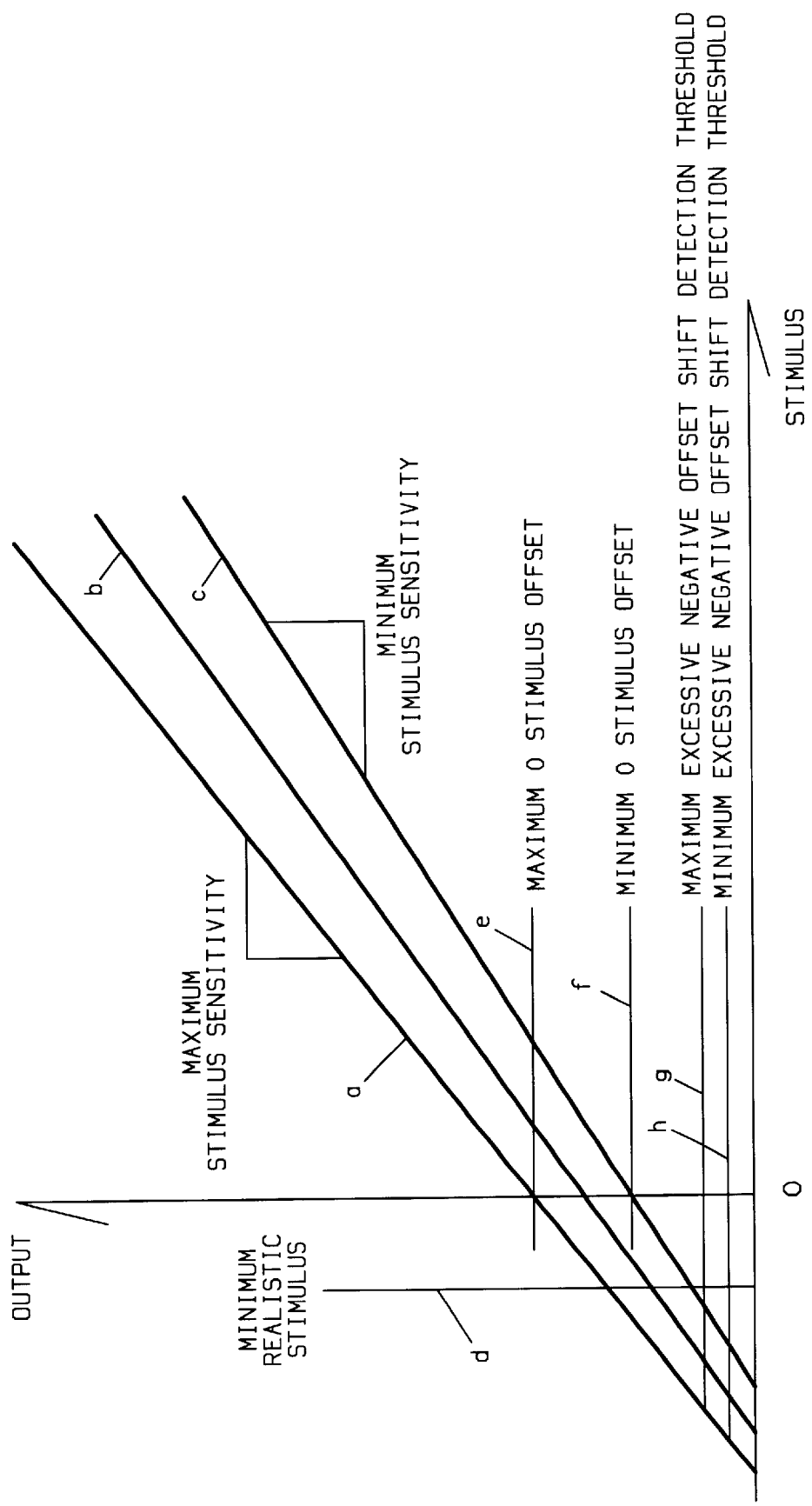
FIG. 2 is a plot of output vs. stimulus (e.g., pressure) and shows the variation in the output versus stimulus relation as well as the variation in the excessive negative offset shift detection circuit.

In FIG. 2, plot line "a" reflects the maximum stimulus sensitivity of a stimulus responsive sensor while plot line "c" reflects the minimum stimulus sensitivity. Line "d" reflects the minimum realistic stimulus. At zero stimulus the output at the maximum stimulus offset is shown at "e" and the output at the minimum stimulus output is shown at "f". The output at "g" and "h" reflect the maximum and minimum excessive offset shift detection thresholds selected to avoid nuisance faults and to have maximum and minimum detection thresholds required to due to manufacturing tolerances.

An example of a circuit made in accordance with the preceding description employs an analog ground voltage equal to 0.70 Vpwr. The partially signal conditioned signal, which serves as the output stage inverting input, will nominally equal the analog ground following offset and gain compensation and at zero stimulus. A fault detecting circuit having a threshold of signals at the inverting input of the output stage greater than {0.70 Vpwr−0.05 Vpwr/Output stage voltage gain} will achieve detection of signals nominally 5% below the nominal output at zero stimulus following sensor calibration. A typical application may set the fault threshold at 3.667V plus a manufacturing tolerance of 10 mV given Vpwr equal to 5.0V and an output stage voltage gain of −1.5V/V.

Compensation for offset and gain enables the definition of the internal range of behavior of the electronics resulting in a known slope and offset of the conditioning signal and, in conjunction with pressure sensing applications, a reference voltage is selected to reflect zero absolute pressure, a pressure which can not be obtained.

It should be noted that the comparison between the voltage at $V_x$ and $V_{REF1}$ is made prior to the output since the output is limited by certain factors, such as supply voltage and external load drive capability.

Among the faults which can be detected by the invention are faults relating to a sense element electrical parameter, such as 0.05 Vpwr/Output stage voltage gain, as well as faults in the conditioning electronics.

It will be understood that the invention can be used with sensors responsive to various stimuli in addition to pressure, such as acceleration and that the invention includes all modifications and equivalents of the described embodiment falling within the scope of the appended claims.

What is claimed:

1. Apparatus for detection of excessive negative offset of a sensor comprising a sense element having a conditioning circuit with positive and negative power supply connections, an output node and connections to a sense element and capable of providing offset signal compensation comprising:

a first comparator having a positive and a negative input and an output, a signal compensated by the offset and gain compensation circuits connected to the positive input of the comparator and a first reference voltage connected to the negative input of the comparator, the compensated signal also connected to a resistor which in turn is connected to the negative input of a second comparator, a controllable switch having an input connected to the output of the second comparator, the positive input of the second comparator connected to a second reference voltage and a feedback resistor connected between the output of the second comparator and the negative output thereof.

2. Apparatus according to claim 1 in which the sense element comprises piezoresistive resistors.

3. Apparatus according to claim 1 in which the sense element comprises a full Wheatstone bridge.

4. Apparatus according to claim 1 in which the sense element is responsive to pressure and the first reference voltage is selected to provide an output indicative of zero absolute pressure.

5. Apparatus according to claim 1 in which the controllable switch is an FET.

6. A method for providing detection of excessive negative offset of a condition responsive sensor signal of a sensor comprising the steps of compensating the signal for gain and offset, comparing the compensative sensor signal with a reference voltage selected to reflect an unobtainable condition when the sensor is properly functioning; and driving the compensated signal to a selected fault level when the compensated voltage rejects said unobtainable condition.

7. A method according to claim 6 in which the condition responsive sensor is responsive to pressure and the reference voltage is selected to indicate a sensed pressure of absolute zero.

\* \* \* \* \*